United States Patent

Cardona

[11] Patent Number: 5,730,500
[45] Date of Patent: Mar. 24, 1998

[54] SHOULDER BELT HEIGHT ADJUSTER

[75] Inventor: Edgardo Cardona, Atchison, Kans.

[73] Assignee: Kinedyne Corporation, North Branch, N.J.

[21] Appl. No.: 763,392

[22] Filed: Dec. 11, 1996

[51] Int. Cl.$^6$ .................................................. A47C 31/00
[52] U.S. Cl. ............................................................ 297/483
[58] Field of Search ................................. 297/464, 468, 297/469, 473, 479, 483, 485; 280/801.1, 801.2, 802, 808

[56] References Cited

U.S. PATENT DOCUMENTS

| | | | |
|---|---|---|---|
| 4,211,430 | 7/1980 | Fancy | 280/802 |
| 4,231,616 | 11/1980 | Painter | 297/468 X |
| 4,236,755 | 12/1980 | Pollitt et al. | 297/483 |
| 4,266,810 | 5/1981 | Thomas et al. | 297/469 X |
| 4,396,228 | 8/1983 | Go | 280/801.1 X |
| 4,400,013 | 8/1983 | Imai | 280/801.1 |
| 4,484,766 | 11/1984 | Buchmeier | 297/479 X |
| 5,074,590 | 12/1991 | DiPaola | 297/468 X |
| 5,306,045 | 4/1994 | Parks | 297/468 X |

*Primary Examiner*—Milton Nelson, Jr.
*Attorney, Agent, or Firm*—Young & Basile, P.C.

[57] ABSTRACT

A web adjuster particularly suitable with occupant restraint systems wherein a shoulder belt, or the like, utilizes an adjustable web for confinement purposes. An upper reversing ring slidably receives an adjustment web having a lower manually adjustable handle for adjusting the web, and the web passes through the ring and through a cam adjustable buckle having an end affixed to the reversing ring. A load ring is attached to the buckle and tilting of the buckle between release and lock positions permits the position of the load ring to be adjusted as the adjustment web is pulled through the reversing ring.

5 Claims, 1 Drawing Sheet

SHOULDER BELT HEIGHT ADJUSTER

BACKGROUND OF THE INVENTION

1. Field of the Invention

The invention pertains to adjustable webs for occupant shoulder belt and restraint systems wherein the position of a load ring attached to a belt or a restraining member may be readily adjusted by the occupant.

2. Description of the Related Art

Web systems for occupant restraints and the like use adjustment buckles to loosen and tension the webs, and a variety of buckles are available.

However, many adjustment buckles for web systems require considerable dexterity to operate properly whereby the web, and its load rings, may be adjusted as desired, and an easily operable occupant restraint system is not presently available wherein tightening can be merely accomplished by pulling on a web free end, and release can be achieved merely by bending or partially rotating a web buckle.

OBJECTS OF THE INVENTION

It is an object of the invention to provide a web adjustment system for occupant restraint systems and the like wherein the relative distance between an anchored reversing ring and a load ring may be reduced merely by pulling upon a loop formed on a web free end, or the like, but movement of the web in an opposite direction to increase the Spacing between the reversing ring and load ring is prevented.

Another object of the invention is to provide a web adjustment system wherein a web passes through a load ring over a web loop and wherein the self-lubricating aspects of the fabric of which the loop is formed aids in reducing the frictional engagement between the loop and the engaged web within the reversing ring.

A further object of the invention is to provide an easily operable web adjustment system for an occupant restraint system capable of resisting high tension forces, and yet which may be readily adjusted by persons of limited manual dexterity.

Yet a further object of the invention is to provide a web adjustment system for occupant restraint systems wherein assembly of the System is simplified by the integral inclusion of attachment loops, or the like, and wherein contiguous relationship between web portions enhances, rather than detracts, from the appearance and operation.

Another object of the invention is to provide a desired load transfer point for the occupant shoulder belt.

SUMMARY OF THE INVENTION

A vehicle occupant restraint system in accord with the invention may be employed within buses and public transportation, and may be employed to anchor shoulder belt systems for the handicapped.

The upper element of the system includes an anchor which supports a reversing ring. An adjustment web extends through the reversing ring and includes a free end having a loop handle sewn thereto. The other end of the web passes through a cam operated buckle and extends upwardly toward the reversing ring and is attached thereto by a sewn loop, or the like. Preferably, the web extends from the loop circumscribing the load ring to a guide web of considerable length having an anchor located at its end, and associated with an adjustment buckle, permitting the guide web to be attached to the load carrying vehicle.

The buckle includes a web loop mounted thereon to which the load ring is attached which is affixed to a shoulder belt or other occupant restraint component of the system. Pulling on the web free end handle causes the web to slip through the reversing ring and buckle producing a two-to-one mechanical advantage in the movement of the buckle and load ring, and yet, the self-locking feature of the buckle having the load ring attached thereto prevents the adjustment system from lengthening.

When it is desired to lengthen the web system to increase the distance between the load ring and the reversing ring, the operator bends or twists the buckle to a position wherein the cam located therein permits the web to slide through the buckle and permits the load ring to be drawn away from the reversing ring. A restraining collar circumscribes the web portions intermediate the buckle and the load ring maintaining a concise assembly, and the practice of the invention economically achieves the desired result.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
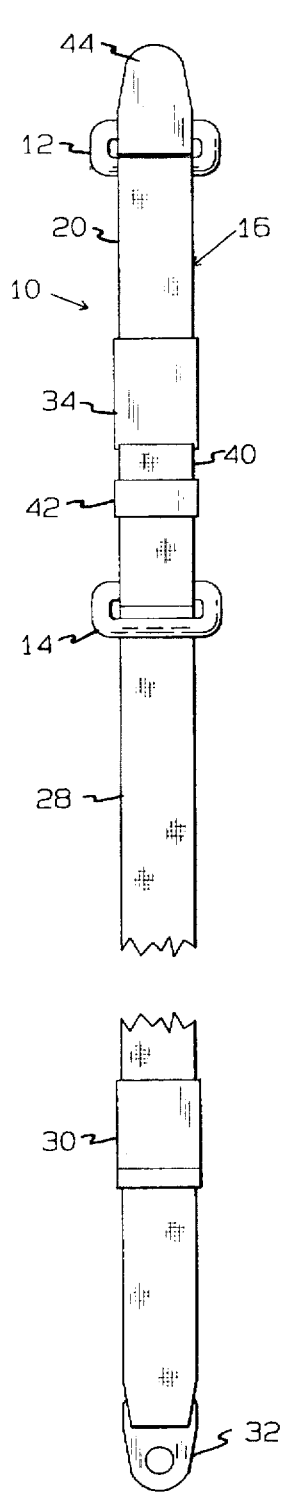
FIG. 1 is a front elevational view of a web adjuster system in accord with the invention, FIG is a side elevational view of the web adjustment system as taken from the right of FIG. 1.

With reference to the figures, the web adjustment system in accord with the invention is generally indicated at 10 and includes a reversing ring 12 and a load ring 14. The purpose of the web adjustment system 10 is to vary the spacing between the reversing ring 12 and the load ring 14 wherein a load web, not shown, attached to load ring 14 is capable of being adjusted up or down as desired.

The adjustment web 16 includes a handle portion 18 and a buckle portion 20. The portions 18 and 20 are on opposite sides, and below, the reversing ring 12. As will be appreciated from the drawings, the adjustment web 16 passes through the reversing ring 12.

The buckle portion 20 includes a fixed end 22 while the web handle portion 18 terminates in a handle loop 24 formed of fabric or web material sewn to the end of the web portion 18.

The end of the buckle portion 20, after passing through a buckle, is attached to the reversing ring 12 by a loop 26. The loop 26 is formed by sewing adjacent portions of the adjustment web 16 together and a guide web 28 extends from the loop 26, usually downwardly, to a buckle 30 to which is attached an anchor clip 32. In this manner, the outer end of the guide web may be attached to a track, or other anchor, not shown, located within a vehicle in which the web adjustment system 10 is used.

A buckle 34 includes a cam slot 36 in which the cam bar 38 is slidably adjustable. The adjustment web 16 passes around the cam bar 38 within the buckle 34, and the cam bar 38 is positionable between a lock position shown in FIG. 2 and a release position shown in FIG. 4.

A load ring loop 40 formed of web material is affixed to the buckle 34 and passes through the load ring 14 to attach the load ring 14 to the buckle 34. A collar 42 circumscribes all of the webs between the load ring 14 and the buckle 34 to maintain the webs in an orderly parallel aligned relationship locating the handle 24 so as to be readily located by the web system operator.

The reversing ring 12 is mounted by the upper anchor 44 to which the reversing ring is attached, and the anchor 44 includes a threaded stud 46 whereby the anchor 44 may be readily attached to the vehicle frame or other fixed structure, not shown.

In operation, the anchor 44 is attached to a fixed vehicle frame or the like, and usually the anchor 44 will constitute the uppermost portion of the web adjustment system 10. The guide web 28 will usually be attached at the lowermost portion of the vehicle or the environment in which the adjuster 10 is located, and will be affixed to a track, bolt, or the like, through the anchor clip 32.

The shoulder belt structure or the like, not shown, which is to be adjusted or positioned by the web adjustment system 10 is attached, or passes through, the load ring 14 whereby movement of the load ring 10 in the direction of the length of the web adjustment system 10 will adjust the shoulder belt or other apparatus, not shown, attached to the load ring 14.

When it is desired to tension the apparatus attached to the load ring 14, which is produced by raising the load ring 14, or decreasing the distance between the load ring 14 and the reversing ring 12, the operator grasps the handle loop 24 and pulls the handle 24 in the direction away from the reversing ring 12. This action causes the adjustment web 16 to move through the reversing ring 12 over the loop 26 lengthening the handle portion 18 and shortening the buckle portion 20. During this action, the web 16 is moving around the buckle cam bar 38 raising the buckle 34 and the associated load ring 14. Because the buckle 34 constitutes a "moving pulley", there is a two-to-one mechanical advantage in the movement of the handle 24 and handle portion 18 as compared to the movement of the buckle 34 in the opposite direction permitting the operator to exert considerable upward force upon the buckle 34 and load ring 14.

Figure 2:
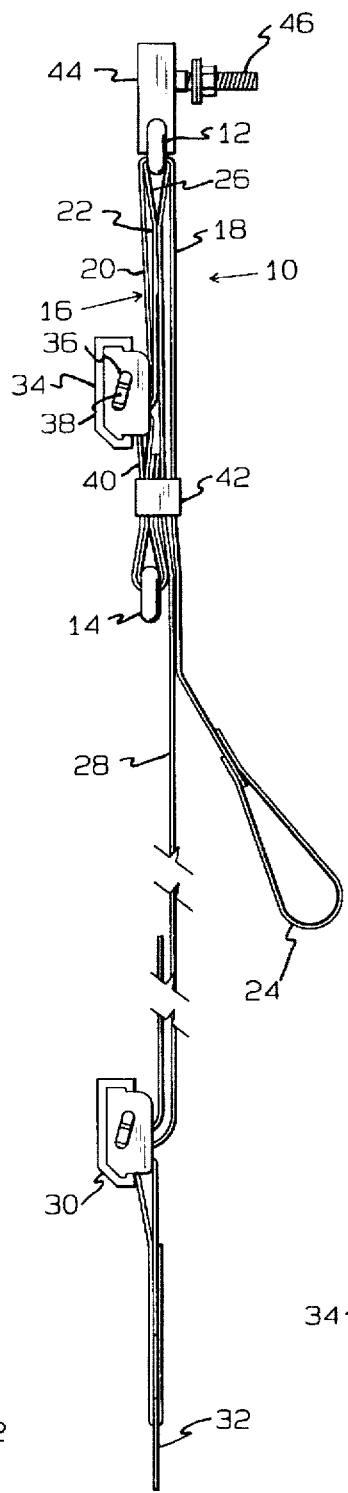
Figure 3:
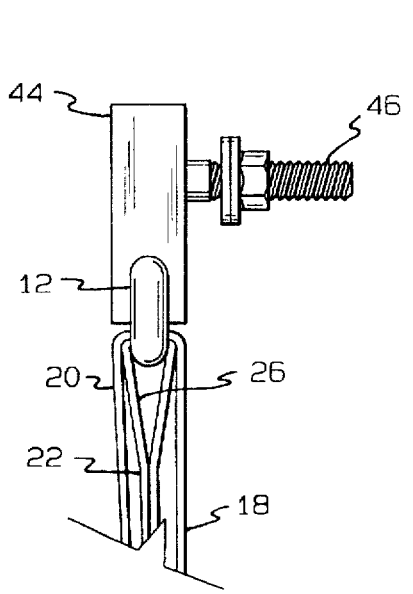
FIG. 3 is a detail side elevational view of the web system adjacent the reversing ring.

Upon the operator ceasing to pull on the handle 24, the tension on the load ring 14 tends to shift the cam bar 38 in slot 36 to the lock position shown in FIG. 2 tightly wedging the web 16 to the buckle 34 automatically maintaining the position of the load ring 14 and the adjustment achieved in the web system or the like attached to the load ring 14. The web adjustment system 10 is now under the desired tension producing the desired tightness of the shoulder belt structure, or the like, attached to load ring 14.

Figure 4:
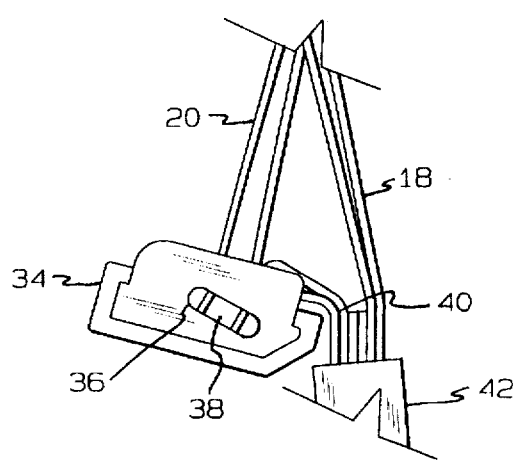
FIG. 4 is an enlarged elevational side detail elevational view of the web buckle twisted to the open or release position.

When it is desired to release the tension within the portions of the adjustment web between the buckle 34 and the reversing ring 12, the operator bends the buckle 34 to the position shown in FIG. 4. In this position, the web 16 will shift the cam bar to its release position shown in FIG. 4 permitting the web to pass around the cam bar 38 and permitting the buckle 34 to be pulled away from the reversing ring 12 increasing the distance between the rings 12 and 14 and releasing the tension in the apparatus attached to the load ring 14.

Accordingly, it will be appreciated that the web adjustment system 10 is capable of one-handed operation. Merely by pulling upon the handle 24, the system may be adjusted upward, and merely by rotating the buckle 34, the system may be adjusted downward.

As all of the web portions of adjustment web 16 may be continuous, a high strength assembly is achieved. The web 16 is merely sewn to achieve the loop 26, and as the web portions 18 and 20 pass over the loop 26, the smooth self-lubricating aspect of the material of the web 16, which may be of a woven polyester or the like, permits the contiguous web portions to readily slide over each other with a minimum of friction.

It is appreciated that various modifications to the inventive concepts may be apparent to those skilled in the art without departing from the spirit and scope of the invention.

I claim:

1. A web adjuster comprising, in combination, a reversing ring adapted to be anchored having an elongated web receiving opening, an elongated adjustment web having a free end and a fixed end, a locking buckle having a cam locking bar positionable between locking and release positions, said adjustment web having a first portion slidably extending through said ring opening and extending through said locking buckle about said locking bar and said fixed end being attached to said reversing ring, a load ring attached to said buckle, manual rotation of said buckle about the length of said cam locking bar shifting said locking bar between said locking and release positions to selectively permit movement of said adjustment web through said buckle to adjust the distance between said reversing ring and said buckle and load ring.

2. In a web adjuster as in claim 1, said adjustment web fixed end comprising a loop encompassing said reversing ring, said adjustment web intermediate said free and fixed ends passing over said web fixed end loop within said reversing ring.

3. In a web adjuster as in claim 2, a guide web having a first end affixed to said reversing ring loop, a second end adapted to be selectively anchored at a location remote from said reversing ring and opposite sides, said adjustment web free end being located on one side of said guide web and said adjustment web first portion between said reversing ring opening and said buckle being located on the other side of said guide web, and a web retainer slidably encompassing said adjustment and guide webs to maintain said webs in adjacent parallel relationship.

4. In a web adjuster as in claim 2, said adjustment web free end having a handle affixed thereto.

5. In a web adjuster as in claim 4, said adjustment web free end handle comprising a fabric loop sewn to said web free end.

* * * * *